United States Patent [19]
Iwata

[11] Patent Number: 5,679,937
[45] Date of Patent: Oct. 21, 1997

[54] SWITCHING DEVICE

[75] Inventor: Keiji Iwata, Saitama, Japan

[73] Assignee: Toyodenso Kabushiki Kaisha, Tokyo, Japan

[21] Appl. No.: 464,074

[22] Filed: Jun. 5, 1995

[30] Foreign Application Priority Data

| Aug. 22, 1994 | [JP] | Japan | 6-219430 |
| Aug. 22, 1994 | [JP] | Japan | 6-219431 |

[51] Int. Cl.⁶ .................................................. H01H 19/54
[52] U.S. Cl. ............................ 200/61.88; 200/11 EA; 200/11 DA
[58] Field of Search .................. 192/89.22; 200/11 E, 200/11 EA, 11 G, 11 J, 11 K, 11 C, 61.85, 61.88, 61.89, 61.91, 302.1, 293, 332, 335, 4, 17 R

[56] References Cited

U.S. PATENT DOCUMENTS

| 3,439,325 | 4/1969 | Leichsenring | 340/71 |
| 3,602,656 | 8/1971 | Graddy et al. | 200/11 J |
| 3,939,313 | 2/1976 | Hayashi et al. | 200/11 J |
| 3,953,267 | 4/1976 | Flynn | 151/13 |
| 4,293,257 | 10/1981 | Peterson | 411/11 |
| 4,854,795 | 8/1989 | Duran | 411/352 |
| 4,865,500 | 9/1989 | Duran et al. | 411/103 |
| 4,897,513 | 1/1990 | Oka et al. | 200/11 EA |
| 4,916,263 | 4/1990 | Ichigo | 200/11 DA |
| 5,023,414 | 6/1991 | Mihara et al. | 200/61.91 |
| 5,199,835 | 4/1993 | Turner | 411/11 |

FOREIGN PATENT DOCUMENTS

| 1-139115 | 9/1989 | Japan | F16B 37/00 |
| 3-3942 | 1/1991 | Japan | H01H 21/02 |
| 3-72861 | 11/1991 | Japan | F16H 59/10 |
| 4-19911 | 2/1992 | Japan | F16B 39/24 |
| 4-51734 | 4/1992 | Japan | H01H 21/22 |
| 4-51397 | 12/1992 | Japan | H01H 21/02 |
| 5-69411 | 9/1993 | Japan | F16B 39/12 |
| 6-12586 | 3/1994 | Japan | H01H 21/18 |
| 6-61600 | 8/1994 | Japan | B60R 16/02 |

*Primary Examiner*—Michael L. Gellner
*Assistant Examiner*—Michael A. Friedhofer
*Attorney, Agent, or Firm*—Birch, Stewart, Kolasch & Birch, LLP

[57] ABSTRACT

A substantially fan-shaped stationary contact base is provided at its pivot of the fan with a shaft hole and at its outer periphery with mounting bosses, each having a through bore. The mounting boss is formed in the middle of the outer periphery of a circular arc to have an enlarged area in the circumferential direction where there is provided an elongated positioning slot which is extended in the radial direction of the shaft hole. A shaft holder supported by a switch case is inserted into the shaft hole and a positioning projection provided on the side of the switch case is then inserted into the elongated positioning slot so that the stationary contact base and the switch case can be assembled together. Since the circumferential direction of the stationary contact base is predetermined by the positioning projection, the stationary contact base is secured, while adjusting its position in the radial direction to the side of the switch case by screws each passed through the corresponding through bore for improving the positioning accuracy of the shaft holder.

20 Claims, 11 Drawing Sheets

SWITCHING DEVICE

BACKGROUND OF THE INVENTION

1. Field of the Invention

The present invention relates to a switching device which is suitable for a shift position switch and the like for vehicles.

2. Description of the Prior Art

The Japanese Utility Model Publication No. Hei 3-3942 discloses a shift position switch as one example of such a switching device. According to its rough construction, there is provided a shift position switch comprising a substantially fan-shaped switch case with a recession opened on one side of the substantially fan-shaped plane, a substantially fan-shaped stationary contact base having its outer periphery secured to an outer periphery of the switch case by screws, a shaft member passing through a shaft hole provided at each pivot of the switch case and the stationary contact base, and a movable, arm-shaped contact holder, one end of which is rotatably secured to the shaft member and housed in the recession of the switch case and the other end of which is provided with a movable contact which is adapted to slidably contact a stationary contact exposing on one side of the stationary contact base, wherein rotation of a shift lever connected to the shaft member allows the movable contact holder to rotate to switch the connection of the movable contact to the stationary contact, thereby detecting a shift position corresponding to a rotational amount of the shaft member.

In this switching device, the shaft member is provided at its one end with a male screw with slits formed thereon which is fastened through a whirl-stop washer by a nut. The whirl-stop washer is also provided with guide portions which are projecting from the inner peripheral edge toward the center so as to engage with the slits of the male screw. A free end of each guide portion is bent aslant toward a bottom portion of each slit.

When such a whirl-stop washer is used, it is possible to omit a rubber packing disposed between the switch body and the whirl-stop washer and as a result, it is possible to obtain such an effect as to prevent an operating load from increasing due to a possible friction of the rubber packing.

3. Disadvantage to be Solved by the Invention

When it is desired to switch a plurality of circuits as described above, it is necessary to secure sure switching of the contact because many contact members as well as the stationary contact of the stationary contact base and the movable contact of the movable contact holder are arranged adjacent to each other. It is further required to make the switching device as compactly as possible.

However, the shaft member is supported at its both ends by the switch case and the stationary contact base which are separate from each other and there is a possibility that the relative position of the switch case and the stationary contact base changes. Accordingly, if there is play between the switch case and the stationary contact base and they are assembled in such a displaced position, there is the possibility of making the center of the shaft member inaccurate.

Thus, inaccurate centering of the shaft member leads to a change of the relative position of the movable contact and the stationary contact and it is therefore not possible to make the stationary contact base and the movable contact holder compact by narrowing the distance between the two adjacent contacts unless the centering accuracy of the shaft member is improved. It is particularly required to make sure that the positioning in the peripheral direction is set on the basis of the shaft hole.

In a connecting projection of the movable contact and a cord connecting portion in the stationary contact base, there are provided many connecting projections adjacent to each other. If they are put too close to each other, there is the possibility of contacting the cord connecting portion with the connecting projections adjacent thereto by accident. It is therefore not possible to narrow the distance between them without limitation, resulting into being a main cause for preventing the stationary contact base from being made compact, On the one hand, when the whirl-stop washer is used, it is necessary for the guide portion to be bent to serve as a spring member. However, the guide portion can not serve its original purpose once twisted because it can not engage with the corresponding slit.

Since the free end of the guide portion is bent to face the bottom portion of the slit, there is formed even when the nut is fastened a comparatively large gap corresponding to the height of the bent portion which projects toward an axis between the whirl-stop washer and the switch body. Accordingly, when a grain of sand and the like go in through this gap, an oil seal provided therein is damaged and sliding resistance of the shaft member becomes large to increase operating load. It is also noted that the oil seal may be pushed out by the expansion of air within the switch body to slip thereout, In such whirl-stop washer with a comparatively large gap provided, it may not serve the purpose of preventing the oil seal from slipping out of the switch body.

It is therefore an object of the present invention to provide an improved switching device which overcomes the above-noted problems and disadvantages in the prior art and also provide a construction favorable to a parting line which is formed on the side of a sliding contact portion of a movable contact holder with a stationary contact base.

SUMMARY OF THE INVENTION

In order to solve the problem of a change of the relative position of the switch case and the stationary contact base, according to the present invention, there is provided a switching device comprising a substantially fan-shaped switch case having a switch case recession with one side of its substantially fan-shaped plane opened and a movable contact holder recession which is deeper than the switch case recession, a substantially fan-shaped stationary contact base having its outer periphery secured to the corresponding outer periphery of the switch case by a screw, a shaft member passing through a shaft hole provided at each pivot of the corresponding fans of the switch case and the stationary contact base so that it is rotatably supported by the shaft hole, an arm-like movable contact holder accommodated in the movable contact holder recession and having one end rotatably secured to the shaft member to move integrally therewith and having the other end provided with a movable contact which is adapted to slidably contact a stationary contact mounted on one side of the stationary contact base, wherein a positioning projection is provided on either the outer periphery of the switch case or the outer periphery of the stationary contact base to project therefrom, while an elongated positioning slit is provided at the corresponding position of the other periphery to which the positioning projection is not provided to engage therewith and the longitudinal direction of the elongated positioning slit is adapted to correspond with the radial direction of the shaft hole.

With this construction, when it is desired to combine the stationary contact base with the switch case, the positioning projection of the switch case is inserted in the elongated positioning slit of the stationary contact base so that the stationary contact base can be positioned relative to the switch case in its peripheral direction. It is however possible to adjust the position of the stationary contact base in the radial direction because the elongated positioning slit extends in the radial direction of the shaft hole made in the stationary contact base.

Thus, the shaft member is first arranged at its one end to engage the shaft hole of the switch case and then at its other end to engage the shaft hole of the stationary contact base, wherein the peripheral portions of the stationary contact base and the switch case are secured together by screws while adjusting the position of the stationary contact base in the radial direction. With this operation, as the stationary contact base is secured in a less displaced condition in the circumferential direction, the centering accuracy of the shaft member may be improved. As a result, since the rotational center of the shaft member becomes more accurate, it is possible to narrow the distance between the stationary contact of the stationary contact base and the movable contact of the movable contact holder, thereby enabling the overall size of the switching device to be more compact.

The movable contact holder is provided at the tip end opposite to the shaft member with a click ball energized by a spring member toward the circular arc-shaped outer periphery of the switch case, wherein a click guide for engaging the click ball may be provided at an inner wall of the circular arc-shaped outer periphery of the switch case. Thus, it is possible to assure the more certain positioning of each part when assembled.

There are also projectingly provided a plurality of connecting projections for connecting to the stationary contacts on the opposite side of the side on which the movable contact of the stationary contact base is adapted to slide, wherein terminals for a plurality of cords introduced from the circular arc-shaped outer periphery of the stationary contact base are connected to the plurality of connecting projections and there may be further provided positioning members for separating each cord at the middle portion of the adjacent connecting projections.

In this case, since the plurality of cords are positioned by the positioning members and the connecting portions of the cords to the connecting projections are certainly separated from the adjacent connecting projections, there is a less possibility of conducting to the adjacent connecting projections by mistake. Accordingly, since the distance between the adjacent connecting projections is narrowed, it is further possible to realize a compact stationary contact base.

On the one hand, the movable contact holder is provided with a step portion formed at a lower position than the sliding contact portion of the movable contact holder with the stationary contact base to serve as a movable contact securing area and this step portion is further provided with a contact recession for securing the movable contact thereto. It is also possible to locate within the movable contact securing area a parting line produced around the contact recession when the movable contact holder is formed by a joint mold composed of a first and second metal molds.

In this case, as the parting line is situated within the movable contact securing area, it is possible to prevent the burr from contacting the stationary contact base, to reduce the sliding resistance and to effect a light operation.

The contact recession may be composed of a substantially cylindrical circular recession at the center, elongated groove-shaped recessions extending on both sides in the diametral directions from the circular recession and wide escapes provided on the connecting portion between the circular recession and the elongated groove-shaped recessions, wherein the parting line may be located at the escapes.

In this case, the going in and out movement of the movable contact relative to the contact recession resulting from making or breaking contact of the movable contact with the stationary contact can be smoothly effected without hindrance by the burr. Accordingly, it is possible to realize a light operation with a small operating load without increasing the sliding resistance and also the deburring operation is no more necessary.

The positioning projection is projectingly provided on either the outer periphery of the switch case or the outer periphery of the stationary contact base, while the elongated positioning slit is provided for the engagement by the positioning projection at the corresponding position of the other periphery to which the positioning projection is not formed, wherein the longitudinal direction of the elongated positioning slit is adapted to correspond to the radial direction of the shaft hole. It is therefore possible to correctly position both the stationary contact base and the switch case even if the outer peripheral wall of the switch case is eliminated. With this construction, it is possible to make the switching device more compact.

In order to solve the problem of the whirl-stop washer, according to the present invention, there is provided a switching device comprising a male screw portion with slits formed on a shaft member which is rotatably supported by a switch body, and a taper nut fastened through a whirl-stop washer to the male screw portion to reduce the diameter of the male screw portion, thereby connecting a shift axis to the shaft member, wherein the whirl-stop washer is provided with a guide portion projecting from the inner peripheral edge toward the center for the engagement with the slits of the male screw portion and with a spring portion formed by raising its one end as a free end to face the different place from the guide portion, and the free end is arranged to locate on the outer peripheral side than the inner peripheral edge.

With this arrangement, the spring portion can serve to prevent the whirl-stop washer from playing and it can be used without inconvenience even when the free end contacts the plane portion of the nut or a step portion of larger diameter of the shaft member to cause some twist during bending. Accordingly, such a strict accuracy control as seen in the conventional production is not necessary and it is also possible to easily manufacture the whirl-stop washer and improve the work efficiency during assembly.

Furthermore, since the free end of the spring portion is arranged to locate on the outer peripheral side than the inner peripheral edge of the whirl-stop washer, it does neither contact the male screw portion when the nut is fastened, nor interfere with the fastening of the nut. It is also possible to increase the degree of freedom in design by adapting the spring portion to the fastening condition, for example by making the spring portion longer in the circumferential direction.

When the free end of the spring portion is disposed to face the nut side, the spring portion of the whirl-stop washer contacts the nut to elastically deform and the whirl-stop washer is arranged at its plane portion to cover the oil seal of the switch case.

In this case, since there is no more gap between the whirl-stop washer and the switch case or a remarkably small gap is only left therebetween, the plane portion of the whirl-stop washer can serve to protect the oil seal on the switch case side, wherein the invasion of a granular foreign substance such as a grain of sand into the oil seal can be prevented. It is therefore possible to prevent the oil seal from being damaged and the operating load of the shaft member from increasing. It is also to be noted that the oil seal can be kept not to slip out of the gap.

The degree of freedom of design according to the present invention is high, It is also possible to make the free end of the spring portion project from the inner peripheral edge toward the center or from the plane portion of the whirl-stop washer to the circumferential direction.

In addition, the slits are formed at intervals of about 90° in the circumferential direction and the guide portions corresponding to the slits are also formed at intervals of about 90° in the circumferential direction, while the spring portions may also be formed at intervals of about 90° in the circumferential direction between each guide portion.

Thus, it is possible to equally prevent the whirl-stop washer from playing in the circumferential direction.

The present invention is applicable to various switching devices. According to one preferred embodiment, there is provided a switching device comprising a switch case, a stationary contact base adapted to be assembled together with the switch case, a shaft member passing through a shaft hole formed in the switch case and each corresponding position of the stationary contact base to be rotatably supported therefrom and having a male screw portion with slits formed thereon, an oil seal interposed between the shaft hole and the shaft member, and a movable contact holder accommodated in the space between the stationary contact base and the switch case and having one end rotatably secured to the shaft member to move integrally therewith and having the other end provided with a movable contact which is adapted to slidably contact a stationary contact provided on one side of the stationary contact base, wherein a taper nut is fastened through a whirl-stop washer to the male screw portion to reduce the diameter thereof, thereby connecting a shift axis to the shaft member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features, and advantages of the invention will become more apparent from the following description when taken in conjunction with the accompanying drawings, in which.

DETAILED DESCRIPTION OF THE PREFERRED EMBODIMENT

Figure 1:
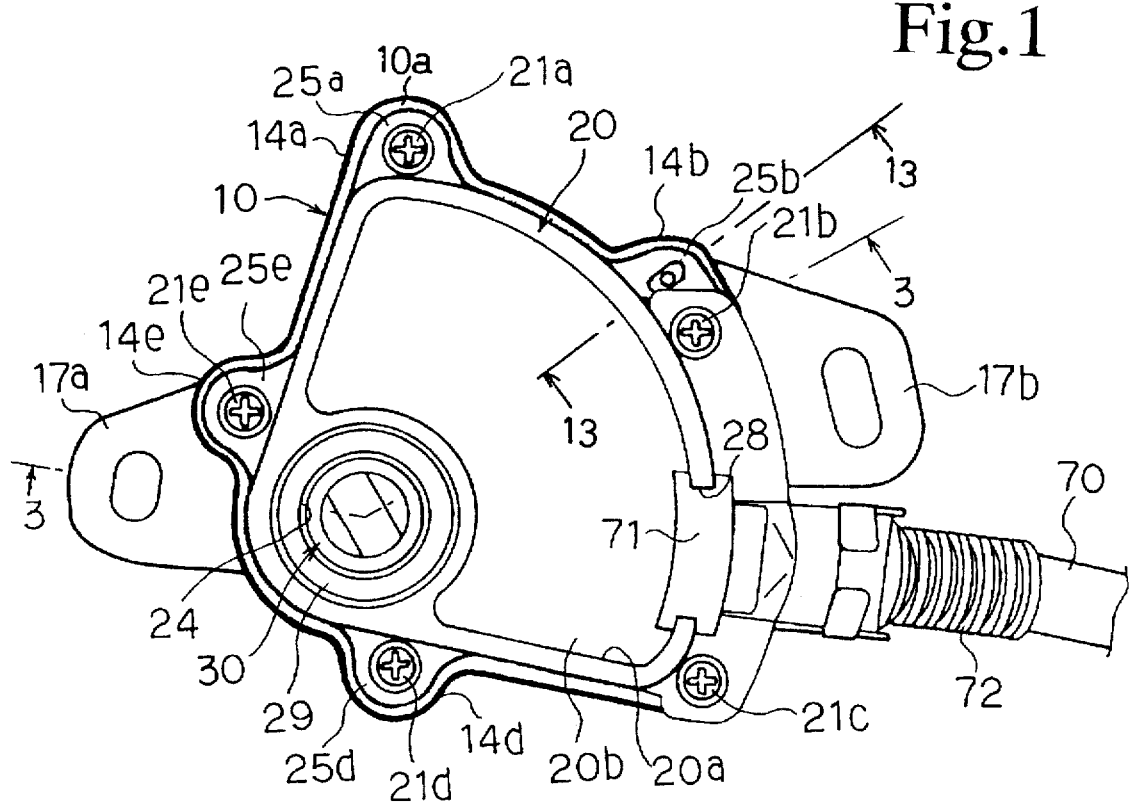
FIG. 1 is a plan view of a shift position switch according to a first embodiment of the present invention.
Figure 2:
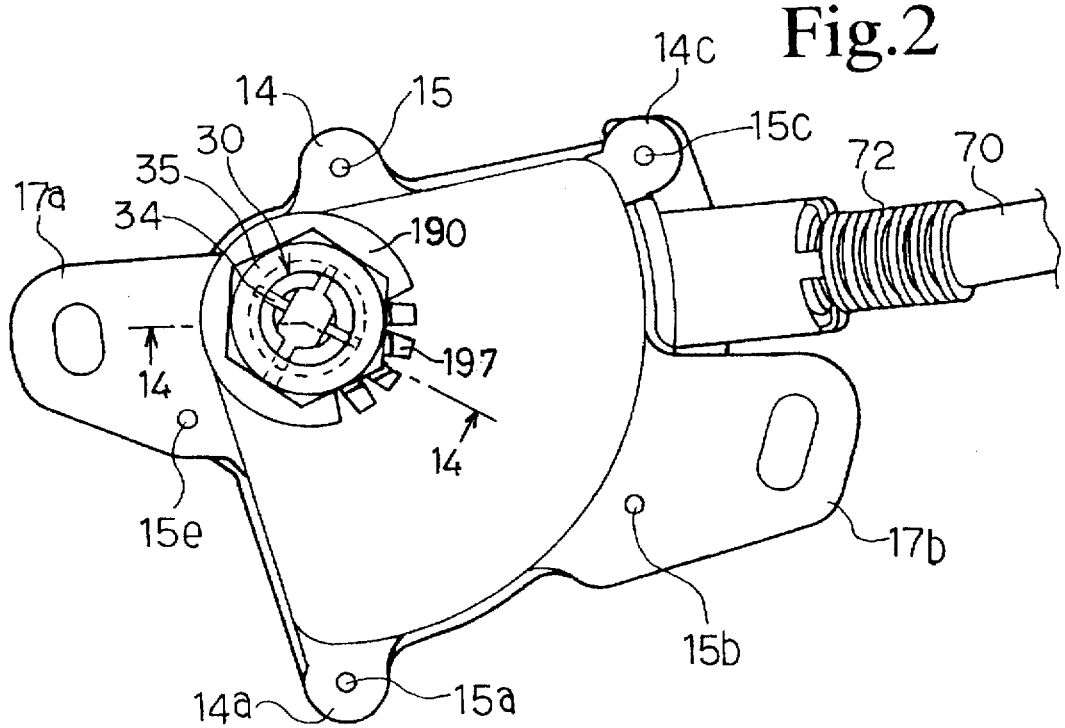
FIG. 2 is a bottom plan view of the shift position switch according to the first embodiment.
Figure 3:
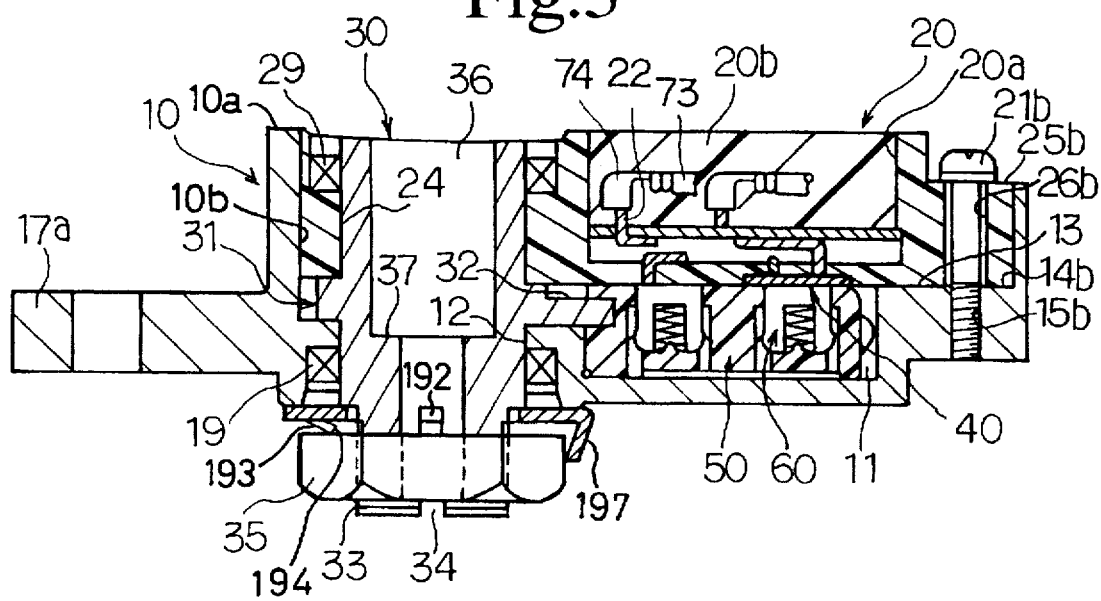
FIG. 3 is a cross-sectional view taken along the line 3—3 of FIG. 1.
Figure 4:
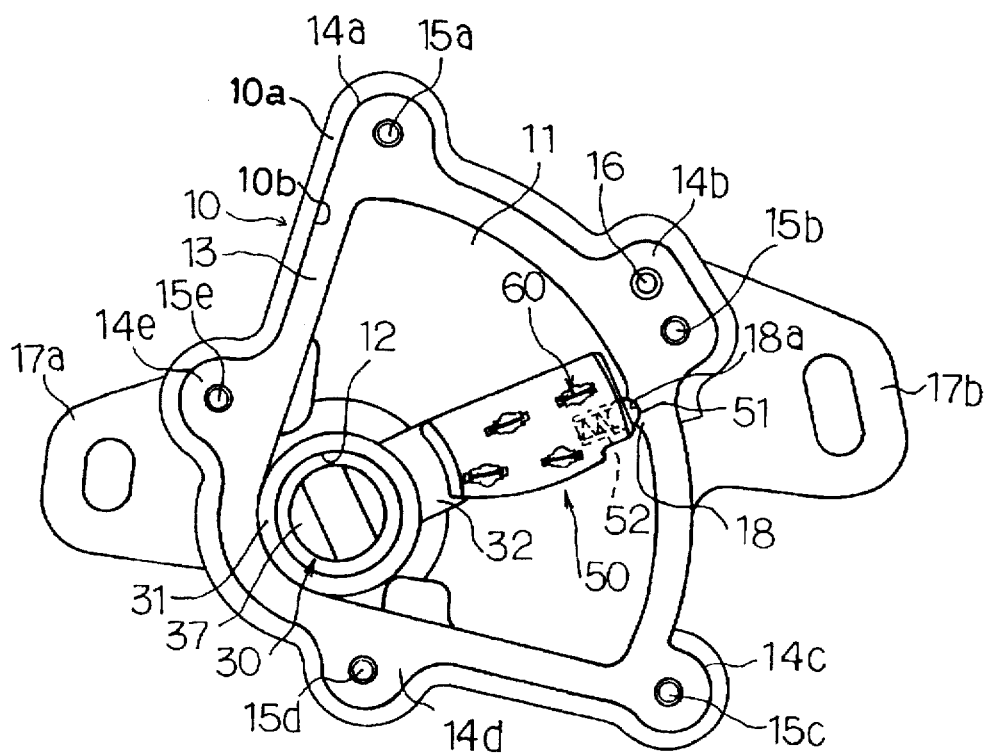
FIG. 4 is a view showing the condition in which a stationary contact base is removed from FIG. 1.
Figure 5:
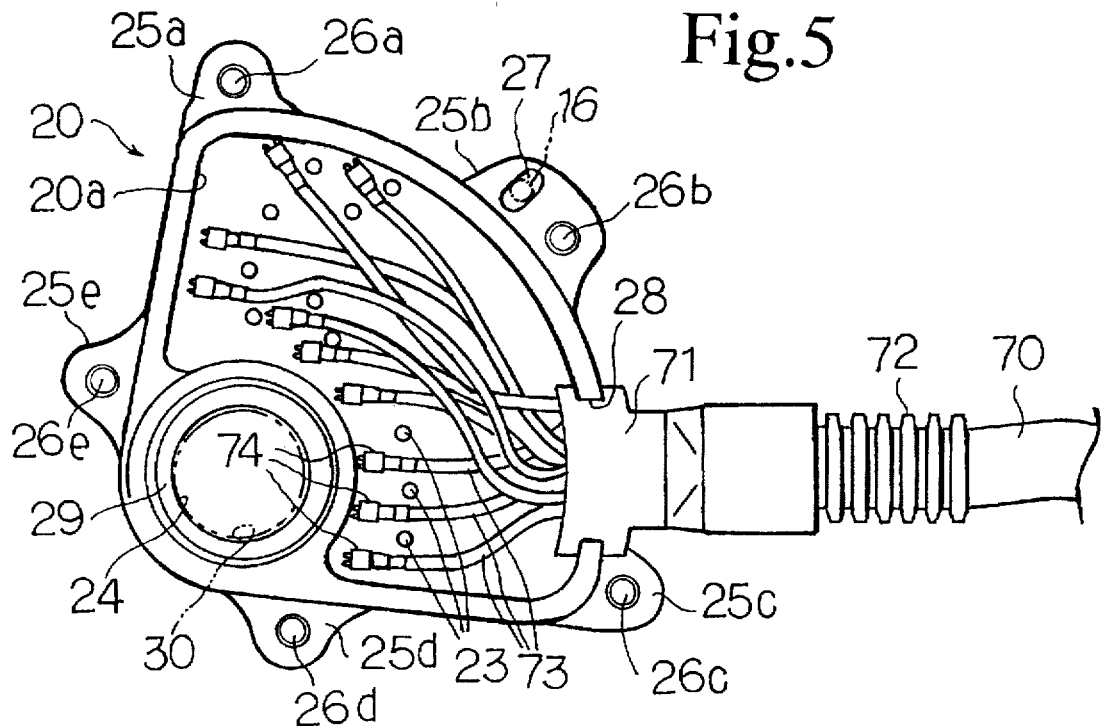
FIG. 5 is a view showing a front side of the stationary contact base according to the first embodiment.
Figure 6:
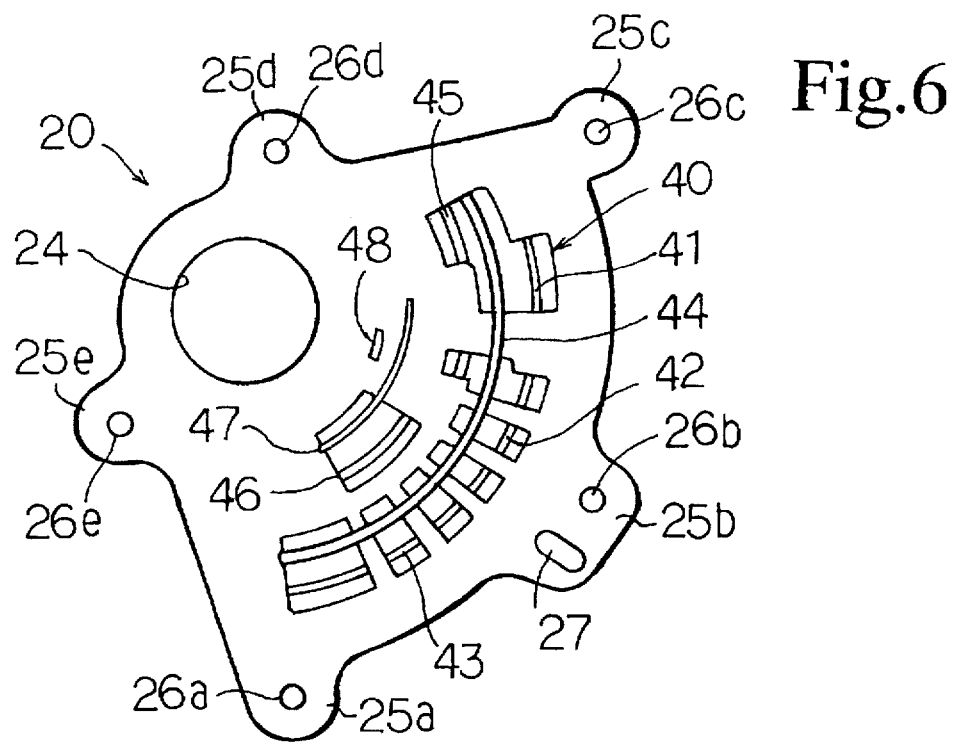
FIG. 6 is a view showing a reverse side of the stationary contact base according to the first embodiment.
Figure 7:
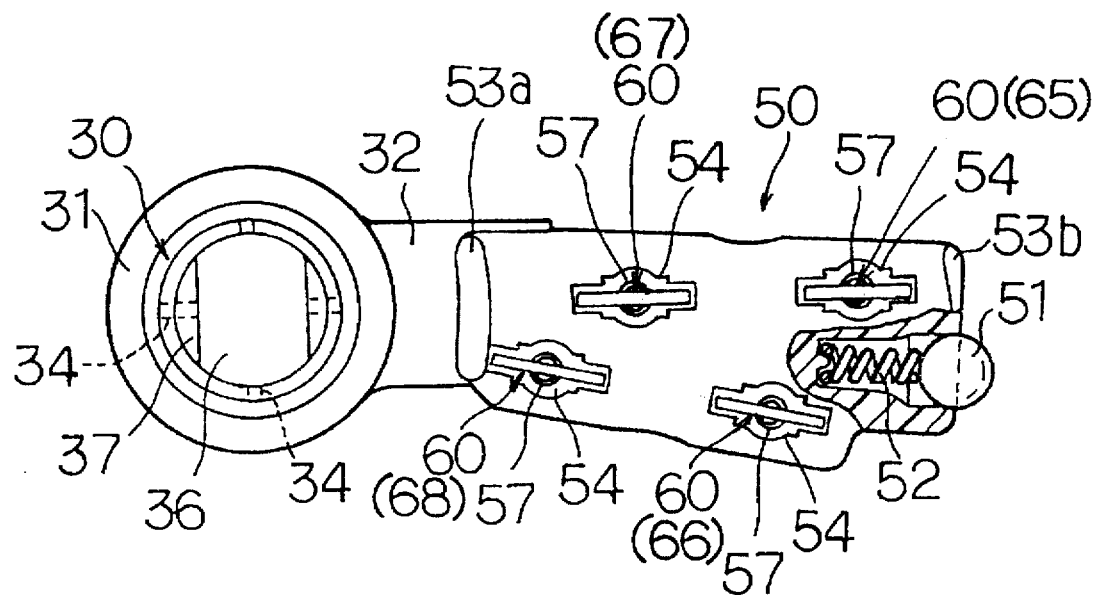
FIG. 7 is a view showing a front side of a movable contact holder according to the first embodiment.
Figure 8:
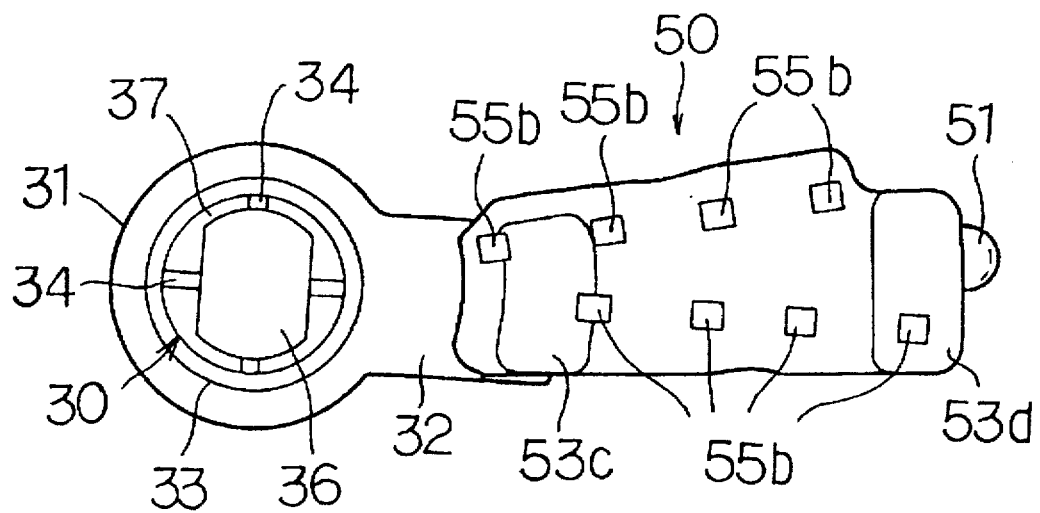
FIG. 8 is a view showing a reverse side of the movable contact holder.
Figure 9:
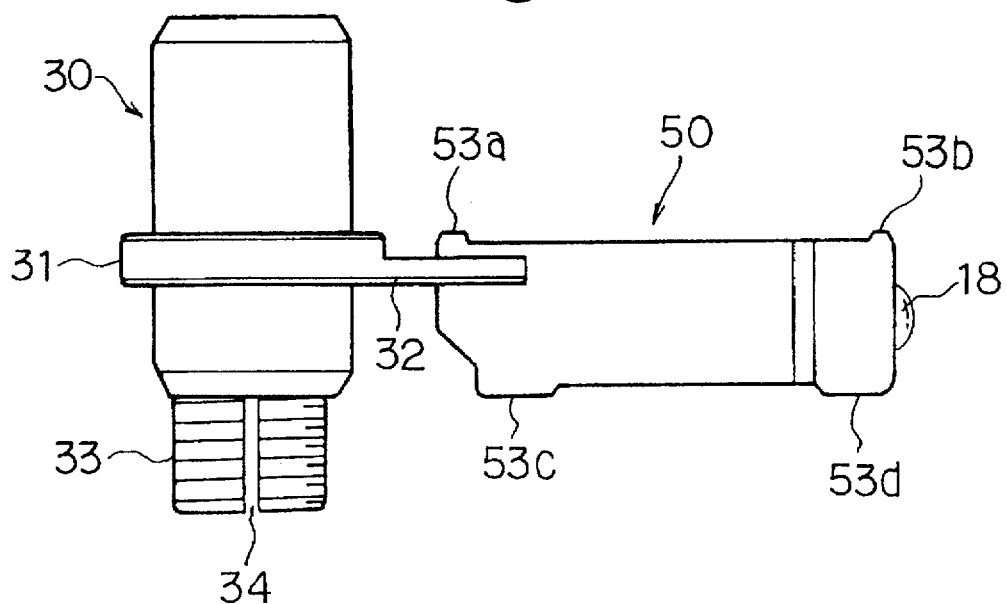
FIG. 9 is a side view of the movable contact holder.
Figure 10:
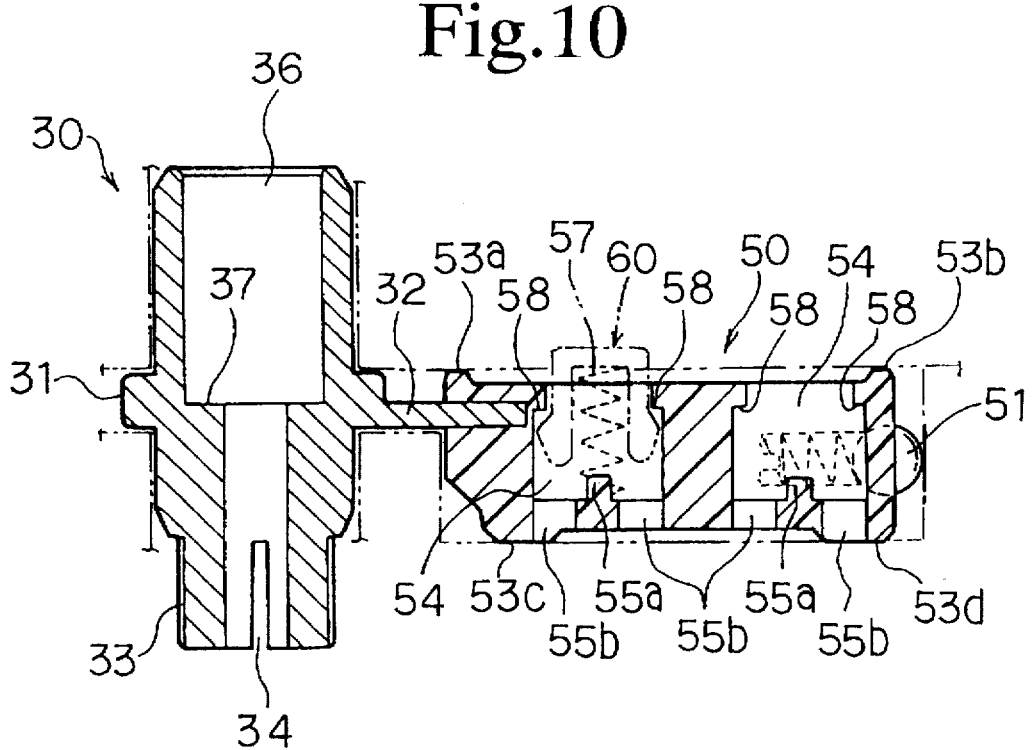
FIG. 10 is a side sectional view of the movable contact holder.
Figure 11:
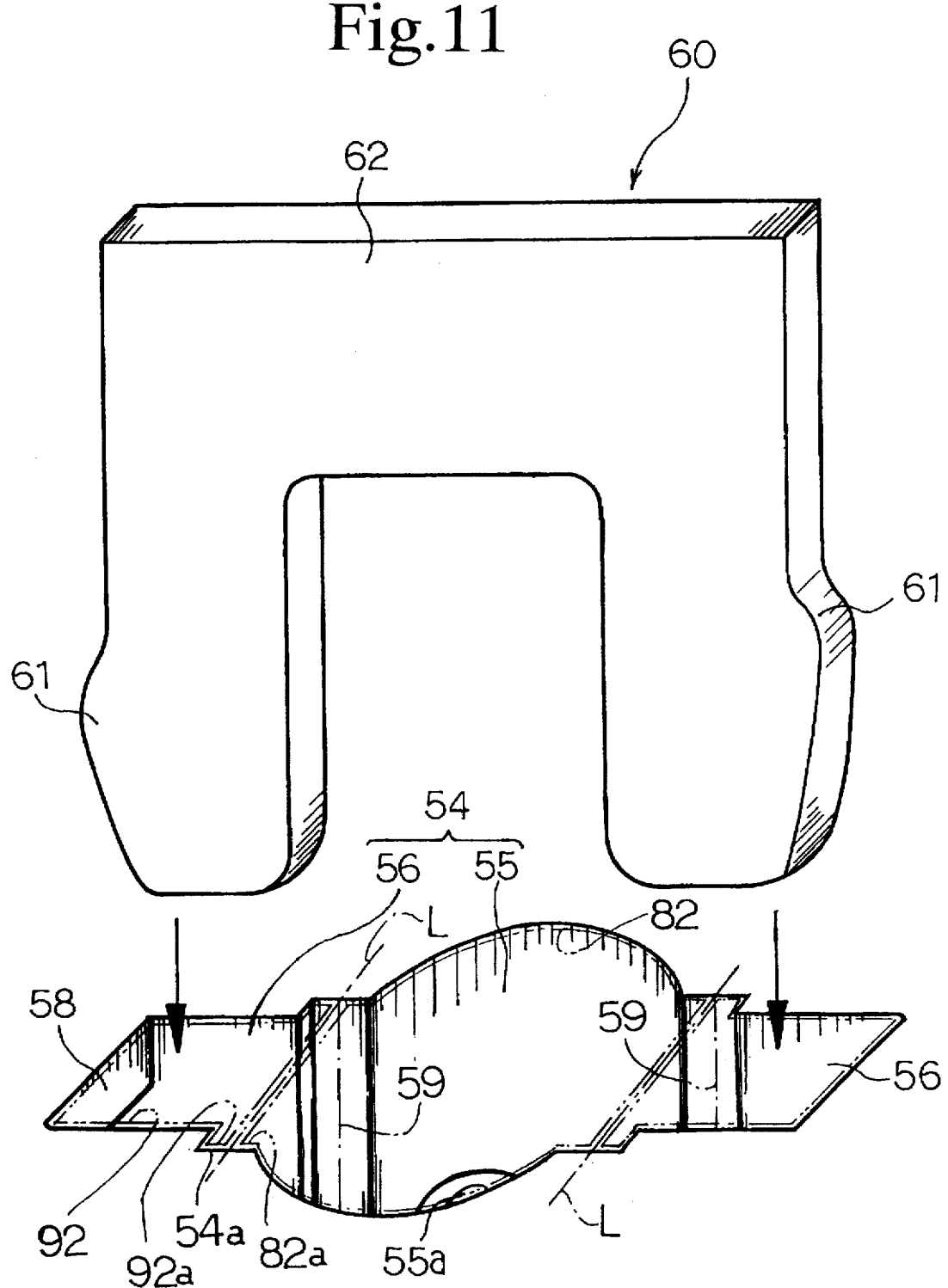
FIG. 11 is an explanatory view showing the mounting of a movable contact according to the first embodiment.
Figure 12:
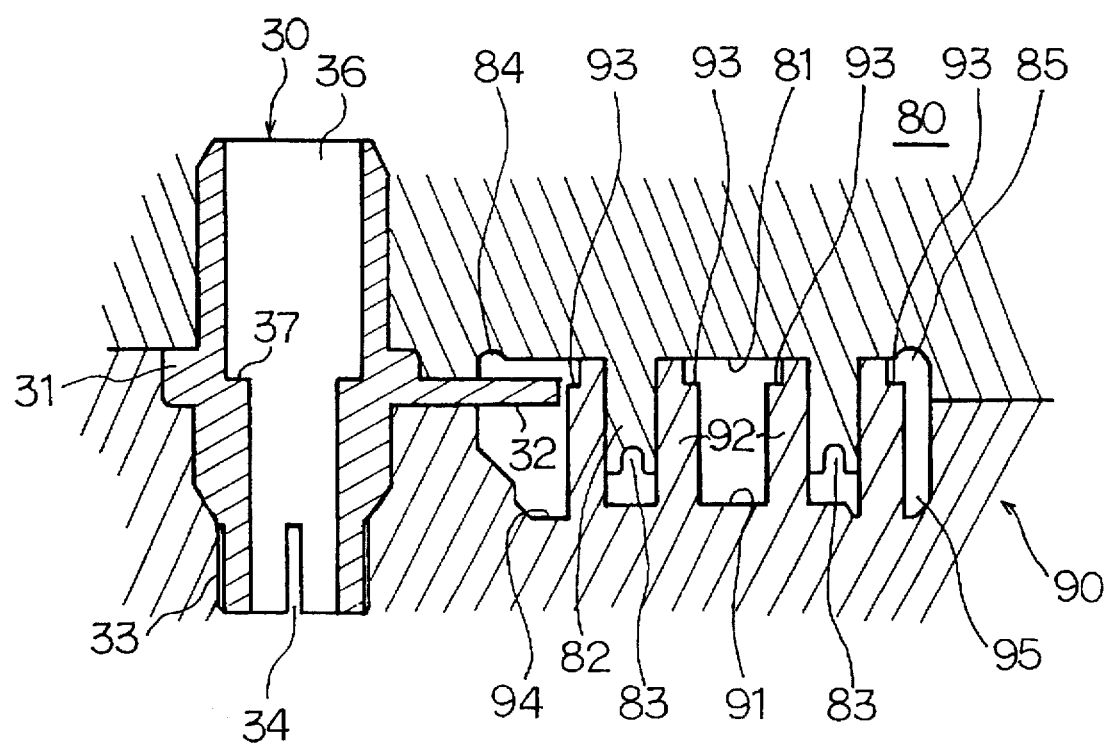
FIG. 12 is a view showing a molding method of the movable contact holder according to the first embodiment.
Figure 13:
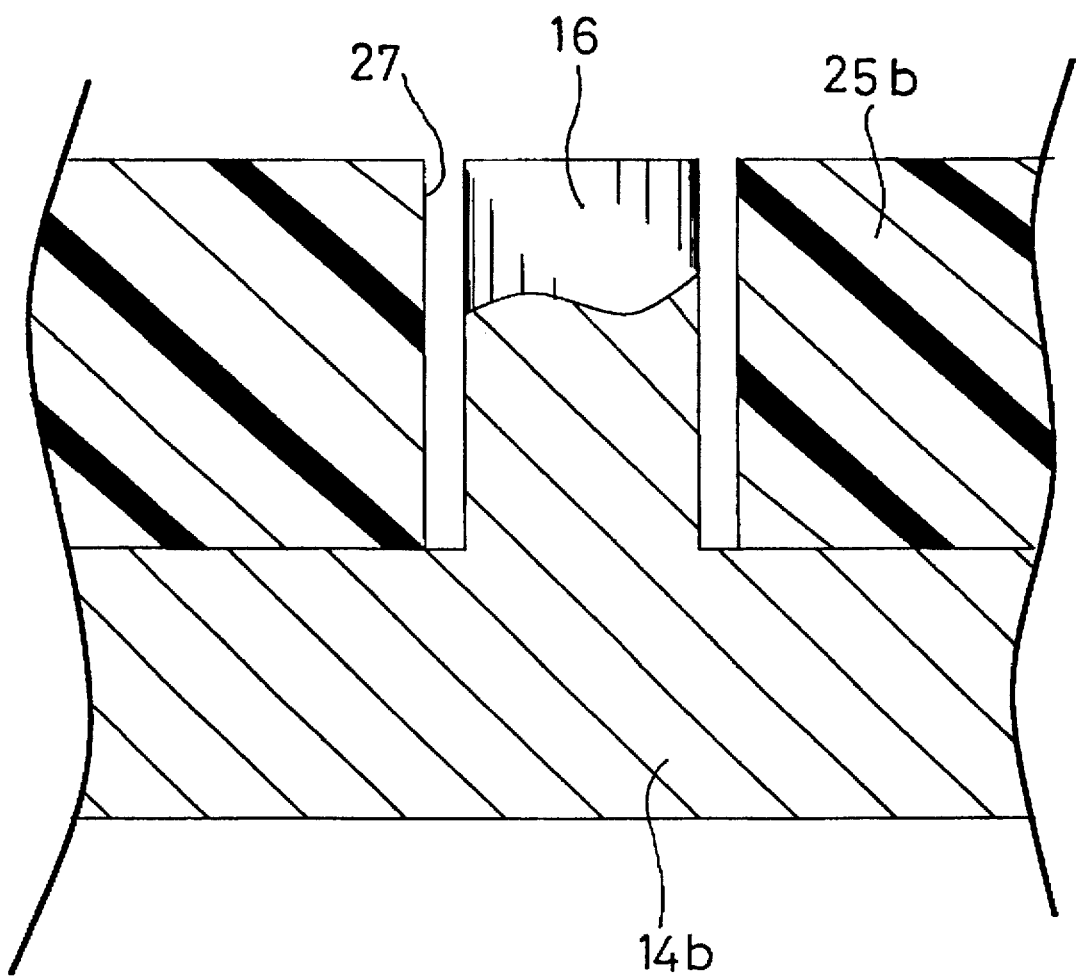
FIG. 13 is a cross-sectional view taken along the line 13—13 of FIG. 1.
Figure 14:
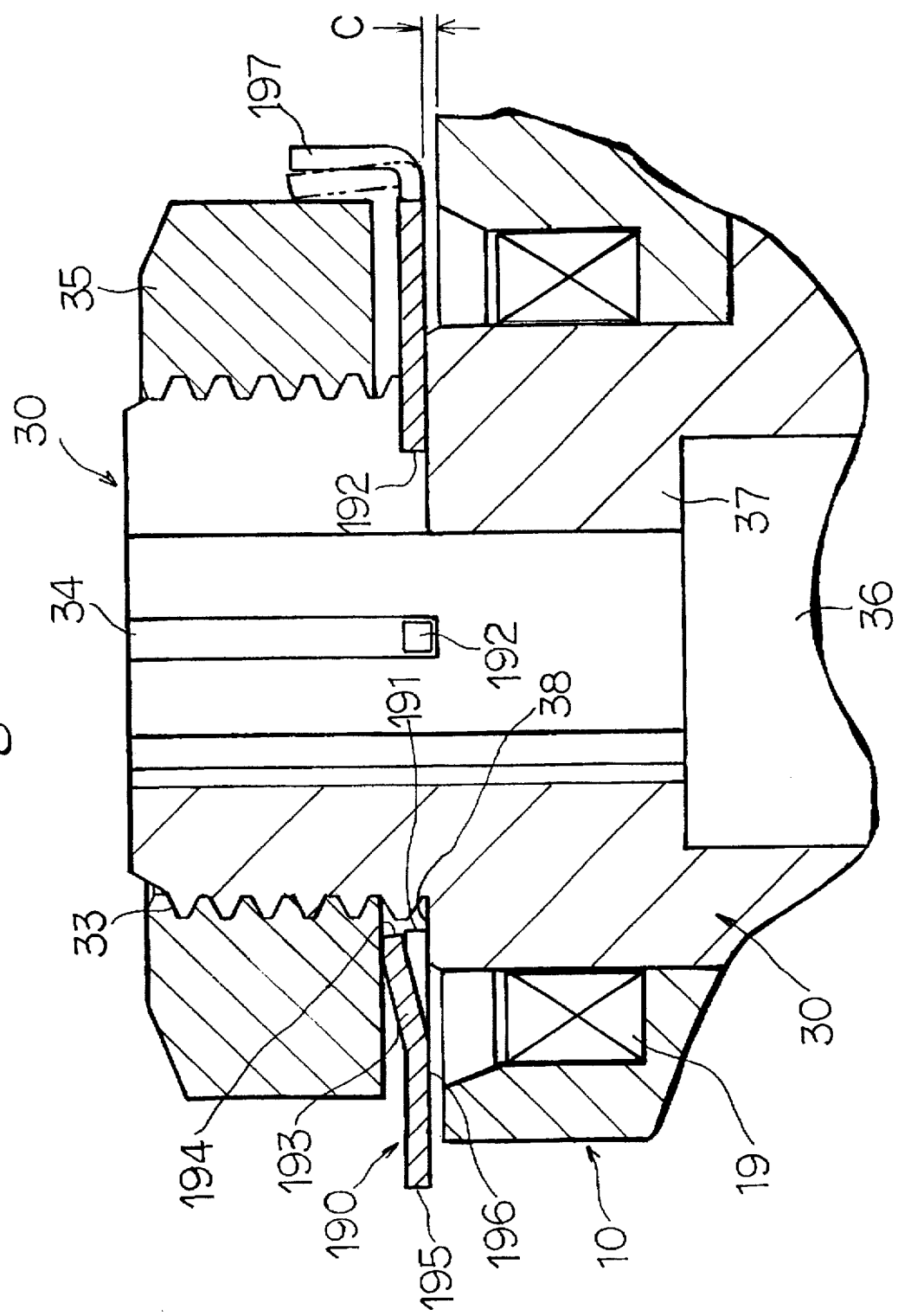
FIG. 14 is a partially sectional view taken along the line 14—14 of FIG. 2.

The present invention will now be described with reference to FIGS. 1 through 14 showing an embodiment of a shift position switch. FIG. 1 is a plan view of a shift position switch and FIG. 2 is a bottom plan view of the shift position switch. FIG. 3 is a cross-sectional view taken along the line 3—3 of FIG. 1 and FIG. 4 is a view showing the condition in which a stationary contact base is removed from FIG. 1. FIG. 5 is a view showing a front side (the side as shown in FIG. 1. The same shall apply hereinafter.) of the stationary contact base when cords are connected. FIG. 6 is a view showing a reverse side (the side as shown in FIG. 2. The same shall apply hereinafter.) of the stationary contact base. FIG. 7 is a front side of a movable contact holder. FIGS. 8, 9 and 10 are views respectively showing a reverse side, a side view and a cross-sectional view of the movable contact holder. FIG. 11 is an explanatory view showing the mounting of the movable contact and FIG. 12 is a cross-sectional view of a metal mold which is used for molding the movable contact holder. FIG. 13 is a cross-sectional view taken along the line 13—13 of FIG. 1 and FIG. 14 is a cross-sectional view taken along the line 14—14 of FIG. 1.

In these figures, a shift position switch comprises a substantially fan-shaped switch case 10, a substantially fan-shaped stationary contact base 20 adapted to engage with the switch case 10, a shaft holder 30 passing through the switch case 10 and the stationary contact base 20 to serve as an example of a shaft member in the present invention, a stationary contact 40 exposed on a reverse side of the stationary contact base 20, a movable contact holder 50 having one end secured to the shaft holder 30, a movable contact 60 mounted on the surface of the movable contact holder 50, and aggregate cords 70 connected to the stationary contact base 20.

The switch case 10 and the stationary contact base 20 are mutually fastened by screws 21a, 21b, 21c, 21d and 21e. As apparent in FIGS. 3 and 4, there is provided a step portion 13 for supporting the stationary contact base 20 in a recession 10b extending along an outer peripheral wall 10a of the switch case 10, and a shaft hole 12 is formed at the pivot of the fan. Furthermore, formed in the recession 10b are mounting steps 14a, 14b, 14c, 14d, and 14e which project outside the outer peripheral portion and there are formed tapped holes 15a, 15b, 15c, 15d and 15e on each of the mounting steps. The switch case 10 is further provided in its recession 10b with a recession 11 for accommodating the movable contact holder 50 therein which is deeper than the recession 10b.

The mounting step 14b is situated at a middle portion of the circular arc-shaped outer peripheral portion and formed to have a widened area in the circumferential direction where a pin-like positioning projection 16 is integrally formed to project therefrom and it is in line with the tapped hole 15b (see FIG. 13). The switch case 10 is integrally provided at its bottom portion with a stay 17a and 17b for securing it to a vehicle body. There is also provided an oil seal 19 and 29 at the end of the shaft hole 12.

The stationary contact base 20, as best shown in FIGS. 5 and 6, is a generally fan-shaped member made of synthetic resins adapted to engage with the inside of the recession 10b of the switch case 10 and provided on the front side with a recession 20a in which many connection projections 22 (See FIG. 3) and positioning members 23 are formed. The positioning members 23 are pin-like members integrally formed with the stationary contact base 20 so that each of them can be situated between the adjacent connection projections 22.

The stationary contact base 20 is provided at the pivot of fan with a shaft hole 24. Projectingly formed outside the outer periphery of the stationary contact base 20 are mounting bosses 25a, 25b, 25c, 25d and 25e and there are formed through bores 26a, 26b, 26c, 26d and 26e on each of the mounting bosses. The mounting boss 25b is situated at a middle portion of the outer periphery having the circular arc-shape and formed with a widened area to correspond to the mounting step 14b, while there is formed an elongated positioning slit 27 at a position corresponding to the positioning projection 16. The longitudinal direction of the elongated positioning slit 27 corresponds to the radial direction of the shaft hole 24.

Also, there is formed a notch 28 on the outer peripheral portion near the mounting boss 25b with which a grommet 71 is arranged to engage. The grommet 71 is integrally formed with a cord holder 72 extending outside. One end of the aggregate cord 70 is extended through the cord holder 72 to be separated into many single lines 73 in the recession 20a, wherein joint fittings 74 connected to the end portion of each single cord 73 are arranged to engage with the tip end of the connection projection 22 for soldering.

Each single cord 73 is separated not to come close to each other near the shaft hole 24 by the positioning member 23. After the single cord 73 is connected to the connecting projection 22, the recession 20a is filled up by resin 20b. FIG. 1 shows the potted condition.

On the reverse side of the stationary contact base 20, a plurality of stationary contacts 40 are concentrically arranged to be exposed in six rows from the outer peripheral side toward the center side. Among them, reference numerals 41, 42 and 43 are disposed in the first row, i.e. the farthest row from the center are the contacts corresponding to each shift position and the numeral 44 in the second row is a ground contact. The numeral 45 in the third row is a starter circuit contact and the numeral 46 in the fourth row is a contact for automatic cruising, while the numeral 47 in the fifth row is a ground contact and the numeral 48 in the sixth row is a contact for the other circuits.

As best shown in FIG. 3 and FIG. 10, and FIG. 12 described below, the shaft holder 30 is a hollow member for passing a shift lever (not shown:) and provided at the outer periphery of its middle portion with a flange portion 31 and an insert portion 32 which is formed by extending a part of the flange portion 31 outside. The shaft holder 30 has a male screw portion 33 formed on the outer periphery of one end extending from the flange portion 31. The male screw portion 33 is also provided with slits 34 extending from the tip end of the shaft holder 30 to a step portion 38 of larger diameter (see FIG. 14) of the shaft member. The slits 34 are made at intervals of 90° in the axial direction from the tip end of the shaft holder 30.

A taper nut 35 is secured to the male screw portion 33, the diameter of which is reduced by fastening the taper nut 35 so as to assure the connection of the shift lever inserted into the hollow portion 36. It is to be noted that the hollow portion 36 is formed therein with a portion having a different diameter from the rest thereof to serve as a whirl-stop portion for the shift lever.

As apparent from FIGS. 7 through 10, the movable contact holder 50 is an arm-like member integrally formed with the shaft holder 30 by inserting the insert portion 32 of the shaft holder 30 into one end of the movable contact holder 50. The movable contact holder 50 is provided at the tip of the other end with a click ball 51 which is urged by a click spring 52 in the pushing out direction to contact a click guide 18 (see FIG. 4) formed on a wall within the circular arc-shaped outer peripheral portion of the switch case 10, thereby assuring the positioning when assembled.

The movable contact holder 50 is provided at its front and reverse side with slidably contacting stepped portions 53a, 53b, 53c and 53d for slidably contacting the shaft holder 30 or the switch case 10. The movable contact holder 50 is provided at its front side with contact recessions 54 for mounting the movable contacts 60.

The contact recession 54 is provided at its center with a generally circular portion 55 and at both ends extending from the circular portion in the diametral direction with elongated groove-shaped recessions 56 which have a generally convex shape in plan. There are also provided wide escape portions 54a on the connecting portion between the circular portion 55 and each of the elongated groove-shaped recessions 56. A contact spring 57 is accommodated in the central inside of the circular portion 55 and one end thereof is secured to a spring boss 55a formed at the bottom of the circular portion 55.

The movable contact 60 is inserted into the contact recession 54 for engagement. As shown in FIGS. 10 and 11, this movable contact 60 is a plate-like member of a generally downward U-shape, the tip of each free end of which is arranged to bulge outside to form an engaging portion 61.

When the left and right engaging portions 61 are inserted into the contact recession 54 while elastically deforming to let them come closer to each other, the slidably contacting portion 62 is urged to project therefrom by the contact spring 57 which has been already accommodated in the circular portion 55, but the restored engaging portions 61 engage with shoulder portions 58 formed at both ends of the elongated groove-shaped recessions 56 to prevent the slidably contacting portion 62 from slipping out of the contact recession 54.

The movable contact 60 is provided in four places on the front side of the movable contact holder 50. When they are called a first movable contact 65, a second movable contact 66, a third movable contact 67 and a fourth movable contact 68 in order from the side of the click ball 51 toward the side of the shaft holder 30, the first movable contact 65 is arranged to slidably move along the stationary contacts of the first row (41, 42, 43) and the second row (44) as shown in FIG. 6, likewise the second movable contact 66 is arranged to slidably move along the second row (44) and the third row (45), the third movable contact 67 moves along the fourth row (46) and the fifth row (47), and the fourth movable contact 68 moves along the fifth row (47) and the sixth row (48), respectively.

Thus, each of the first movable contact 65 through the fourth movable contact 68 is required to slidably contact the ground contact 44 or 47 and at the same time, when each movable contact contacts the other stationary contacts, it can send a predetermined signal such as the position signal, the starter signal, the automatic cruising signal, and the other signal to the aggregate cord 70.

FIG. 12 is a view showing a molding method of the movable contact holder 50 which is formed by the joint dies of a first metal die 80 and a second metal die 90. In this case, in the molding portion of the contact recession 54, a projection 82 molding the circular portion 55 is designed to project from a die surface 81 of the first metal die 80 toward the second metal die 90. As shown in FIG. 11, the cross-sectional shape of the projection 82 is designed to partially project the projection 82a which in the outer peripheral portion of a circle forms the escape portion 54a in both sides of the diametral direction.

On the one hand, a pair of projections 92 for molding the elongated groove-shaped recessions 56 project from a die surface 91 of the second metal die 90 to sandwich the projection 82 therebetween, while their top ends are arranged to be very close to the die surface 81 of the first metal die 80. There are also formed enlarged portions 92a adapted to form the escape portions 54a at the contacting portion of the projections 92 with the projection 82a (see FIG. 11).

The top end of the projection 82 is designed not to reach the die surface 91 and there is formed a recession 83 at the top end. The spring boss 55a for supporting the contact spring 57 is formed by the gap between the top end of the projection 82 and the die surface 91, and the recession 83.

When the movable contact holder 50 is molded, the projection 82 is engageably inserted into the space formed between the left and right projections 92 and both projections 82a contact the left and right enlarged portions 92a, respectively and as a result, a parting line is formed along the contacting portion. Namely, as shown in FIG. 11, in the escape portion 54a, the die is separated into the projection 82 and the projections 92 (the letter L in the figure shows the die joint surface of the projection 82 and the projections 92) and the parting line 59 is caused along this die separation portion. On the reverse side of the movable contact holder 50, holes 55b by the projections 92 are provided to form a pair at the places sandwiching the spring bosses 55a therebetween.

There are formed small diameter portions 93 at the outer periphery of the top end portions of the projections 92 and since space is formed between the small diameter portions 93 and the die surface 81, shoulder portions 58 are formed by the space portions. Also, recessions 84 and 85 formed in the first metal die 80 form slidably contacting portions 53a end 53b, while recessions 94 and 95 form slidably contacting portions 53c and 53d, respectively. There is also provided a downwardly stepped portion between the slidably contacting portions 53a and 53b on the front side of the movable contact holder 50 which is adapted to serve as the movable contact mounting area.

As apparent from FIG. 12, the joint surface of the first metal die 80 and the second metal die 90 in the movable contact mounting area of the movable contact holder 50 is formed in the lower position than the recessions 84 and 85 which are namely the slidably contacting portions 53a and 53b after molding process.

Figure 15:
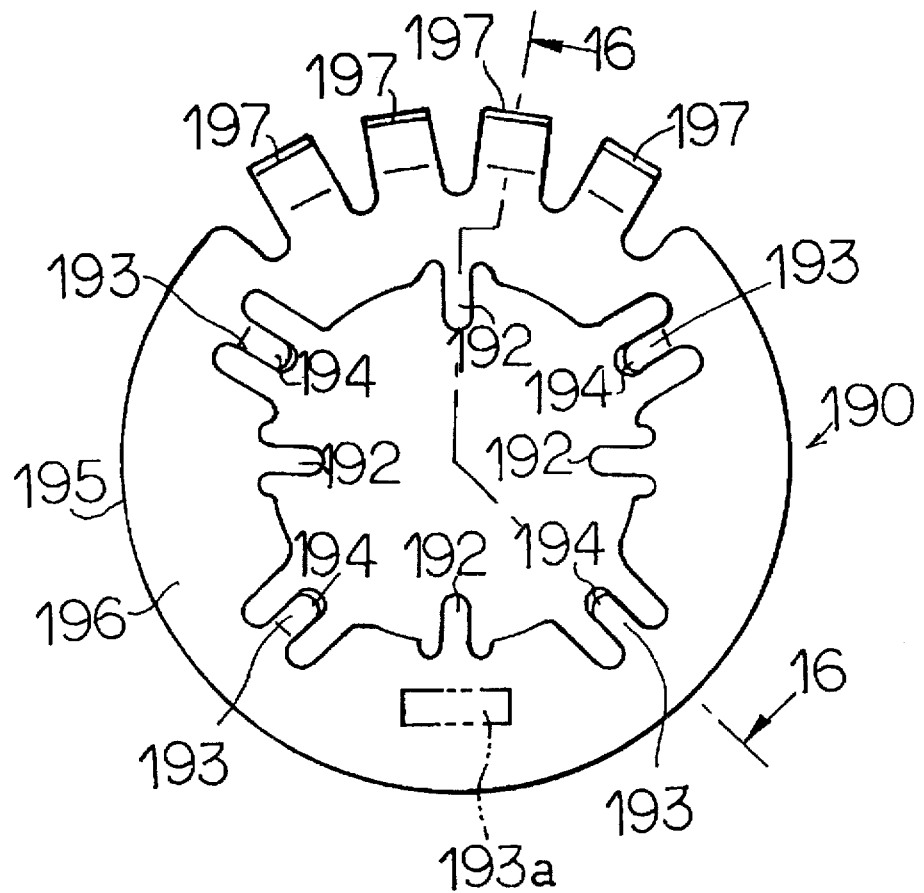
FIG. 15 is a plan view of a whirl-stop washer.
Figure 16:
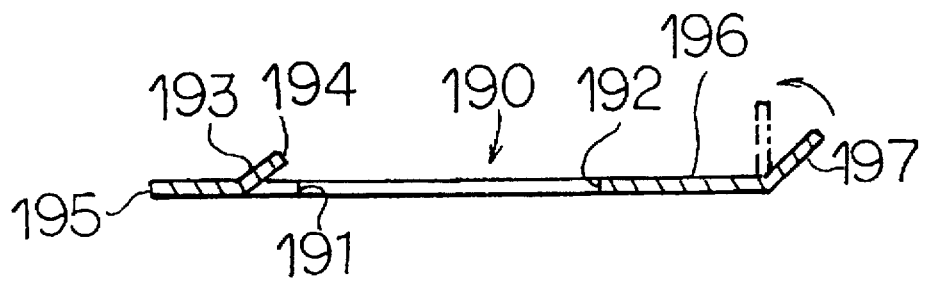
FIG. 16 is a cross-sectional view taken along the line 16—16 of FIG. 15.

Description of a whirl-stop washer 190 will now be made hereinafter. FIG. 14 is a partially sectional view taken along the line 14—14 of FIG. 2. FIG. 15 is a plan view of the whirl-stop washer 190 and FIG. 16 is a cross-sectional view taken along the line 16—16 of FIG. 15.

As best seen in FIG. 14, the male screw portion 33 is provided with a taper nut 35 and the diameter of the male screw 33 is reduced by fastening the taper nut 35 for sure connection to the shift axis which is inserted into the hollow portion 36. The hollow portion 36 is formed therein with a different diameter portion 37 from the rest to serve as a whirl-stop portion for the shift axis. The base portion of the slit 34 is provided with stepped portion 38 of larger diameter and arranged to slightly project from the outer surface of the switch case 10, wherein when the whirl-stop washer 190 is depressed by the taper nut 35, there is formed small clearance C between the whirl-stop washer and the outer surface of the switch case 10. The clearance C is set to be as small as possible.

Interposed between the taper nut 35 and the switch case 10 is the whirl-stop washer 190. As apparent from FIGS. 14 through 16, the whirl-stop washer 190 is arranged such that its tongue-shaped guide portion 192 is located at intervals of 90° in the circumferential direction and adapted to project from a ring-shaped inner peripheral edge 191 toward the center to engage with the slit 34.

Furthermore, a spring portion 193 of the whirl-stop washer 190 is also disposed between the adjacent guide portions 192 at intervals of 90° in the circumferential direction. The spring portion 193 has a free end 194 raised by press working to face the taper nut 35 and the free end 194 is arranged to locate within the plane surface portion 196 pulled to the side of the outer peripheral edge 195 further than the inner peripheral edge 191.

A stopper 197 of generally L-shaped section is provided on the side of the outer peripheral edge 195. After the taper nut 35 is fastened, this stopper 197 is adapted to be bent toward the taper nut 35 to prevent the latter from loosening.

The operation of the present embodiment will now be described in detail. First, when it is desired to assemble this switching device, the male screw portion 33 side of the shaft holder 30 is inserted into the shaft hole 12 of the switch case 10. Next, the movable contact holder 50 integrally incorporated with the shaft holder 30 is accommodated in the recession 11 and then the click ball 51 is arranged to engage with the initial position groove 18a of a click guide 18.

Subsequently, the stationary contact base 20 is fitted in the recession 11b of the switch case 10 while inserting the other end of the shaft holder 30 into the shaft hole and the positioning projection 16 is fitted into the elongated positioning slit 27 formed on the mounting boss 25b of the stationary contact base 20 (see FIG. 13).

With this operation, play of the stationary contact base 20 in the circumferential direction is removed, Since the elongated positioning slit 27 is made long in the radial direction of the shaft hole 24, the position of the stationary contact base 20 in the diametral direction is adjusted. Next, the mounting steps of 14a, 14b, 14c, 14d and 14e and 25a, 25b, 25c, 25d and 25e are overlapped to correspond the tapped holes of 15a through 15e with the counterparts of 26a through 26e, thereby securing the stationary contact base 20 to the switch case 10 by fastening the screws of 21a through 21e.

As a result, although the shaft holder 30 is secured at its both ends to the different members of the switch case 10 and the stationary contact base 20 which can effect relative movement to each other, since the play in the circumferential direction can be prevented, it is possible to correct centering.

Also, when the single cords 73 are required to be connected to the connecting projections 22 which are projecting into the recession 20a of the stationary contact base 20, the single cords 73 are individually separated by the positioning members 23 provided between the adjacent connecting projections 22 even when many connecting projections 22 adjoin each other and as a result, it is possible to position those single cords adjoining each other not to let them come closer to each other.

Thus, if the metal fittings 74 attached to the top ends of the single cords 73 are arranged to engage with the connecting projections 22, it is possible to facilitate temporary connection and in such a temporary connecting condition, quick soldering can be effected without regard to the positional relation of the connecting projections 22 and the metal fittings. Accordingly, it is not only possible to improve the work efficiency during the cord connection, but also to narrow the distance between the connecting projections 22 adjoining each other, thereby making the stationary contact base 20 more compact.

Accordingly, since the relative position of the movable contact 60 to the stationary contact 40 becomes more accurate, it is possible to narrow the distance between mutual contacts to arrange them in higher density and as a result, to make the stationary contact base 20 and the movable contact holder 50 more compact, thereby making the overall switching device more compact.

In addition, as apparent from FIGS. 11 and 12, in the movable contact mounting area on the front side of the movable contact holder 50, all the parting lines between the first metal die 80 and the second metal die 90 are formed in the lower places than the slidably contacting portions 53a and 53b. Referring to the contact recession 54, burrs are produced along the parting line 59 as shown in FIG. 11, but this parting line 59 is situated within the escape portions 54a and still inside where it does not contact the movable contact 60.

In fact, since the movable contact 60 is arranged to slidably contact the side of the stationary contact 40 in the projected condition of its slidably contacting portion 62, there is no such possibility that the burrs generating along the parting line of this portion make a direct slidable contact with the stationary contact 40 and the stationary contact base 20. Also, it is possible to effect a smooth going in and out movement by the movable contact 60 relative to the contact recession 54 resulting from making or breaking contact of the movable contact 60 with the stationary contact 40 without obstruction by the burrs. It is therefore possible to make light operation with less operational load without increasing the sliding resistance and to make a sure contact connection. It is also possible to make the deburring work unnecessary.

The present invention is not confined to the embodiment described above, but may be embodied or practiced in other various ways without departing from the spirit or essential character thereof. For instance, the positioning projection 16 may be formed on the side of the switch case 10, while the elongated positioning slit 27 may be formed on the side of the stationary contact base 20.

On the one hand, there is disposed the whirl-stop washer 190 between the taper nut 35 and the switch case 10. This whirl-stop washer 190 is arranged in such a manner that the guide portion 192 which is formed at the ring-shaped inner peripheral edge 191 to project toward the center for the engagement with the slit 34, is provided at intervals of 90° in the circumferential direction.

The spring portion 193 is also provided between the adjacent guide portions 192 at intervals of 90° in the circumferential direction. This spring portion 193 is arranged such that its free end 194 is formed to face the taper nut 35. Since the free end 194 is arranged to locate in the position pulled toward the outer peripheral side further than the inner peripheral edge 191, when the taper nut 35 is fastened, the spring portion 193 is depressed by the taper nut 35 to elastically deform and the whirl-stop washer 190 is arranged such that its plane portion 196 is pushed against the step portion 38 to cover the oil seal 19. There is formed a clearance C between the whirl-stop washer 190 and the outer surface of the switch case 10.

Accordingly, the spring portion 193 serves to prevent the whirl-stop washer from causing the play and since the free end 194 contacts the plane end face of the taper nut 35, even if there is caused some twist when bent, the spring portion 193 can be used without inconvenience. It is therefore unnecessary to conduct severe accuracy control in production as seen in the past, possible to easily produce the whirl-stop washer 190 and also to improve the work efficiency during assembly.

It is also to be noted that since the free end 194 of the spring portion is arranged to locate on the outer peripheral side rather than the inner peripheral edge 191 of the whirl-stop washer 190, the free end 194 does not contact the male screw portion 33 when the taper nut is fastened, nor give any influence on the fastening of the taper nut 35.

Furthermore, even if the taper nut 35 is fully fastened, the whirl-stop washer 190 and the taper nut 35 are secured to the step portion 38 of the shaft holder 30 which is adapted to rotate together, and they are kept away from the switch case 10 due to the clearance C. Accordingly, there is not caused any sliding resistance between the whirl-stop washer 190 and the switch case 10 and the operational load can be reduced. However, the whirl-stop washer 190 may be arranged to make a direct contact with the switch case 10. Even in this case, since the contact is made between the two metals, the frictional resistance is remarkably low compared with the conventional contact through the rubber packing. This direct contact method can also dispense with much operational load to the shaft holder 30.

Since the clearance C between the whirl-stop washer 190 and the switch case 10 can be made as small as possible or such clearance C can be removed as described above, it is possible for the plane portion of the whirl-stop washer 190 to protect the oil seal 10 provided on the side of the switch case 10, to prevent granular foreign substance such as a grain of sand from entering the oil seal 19, to prevent the oil seal 19 from being damaged and to prevent the operational load of the shaft holder 30 from increasing. Due to the expansion of the air within the switch case 10, even if a force is exerted to push the oil seal out of the switch case 10, the washer 190 can serve as a stopper for the oil seal 19.

Although the longitudinal direction of the spring portion 193 according to the present embodiment is arranged to correspond to the radial direction of the whirl-stop washer 190, it is possible to make it long in the intersecting direction as shown in FIG. 15 (see reference numeral 193a; one example shown by an imaginary line). Namely, the spring portion 193 may be formed anywhere within the plane portion 196 between the inner peripheral edge 191 and the outer peripheral edge 195. It is at your option to select the shape and number of the spring portion 193 within the spirit of the present invention. The spring portion 193 may also be a separate member from the whirl-stop washer 190. It may be attached to the whirl-stop washer 190 by a suitable means such as welding. Thus, it is possible to design the spring portion 193 depending on its fastening condition and increase the degree of freedom in design. In addition, the washer 190 may be formed and used in such a manner that the spring portion 193 projects to the side of the switch case 10 as seen in the past.

Another embodiment of the present invention will now be described referring to FIGS. 17 and 18. In this embodiment, the structure of the switch case is only modified and the rest remain same. Accordingly, the functional portions common to the previous embodiment are given the same reference numerals.

Figure 17:
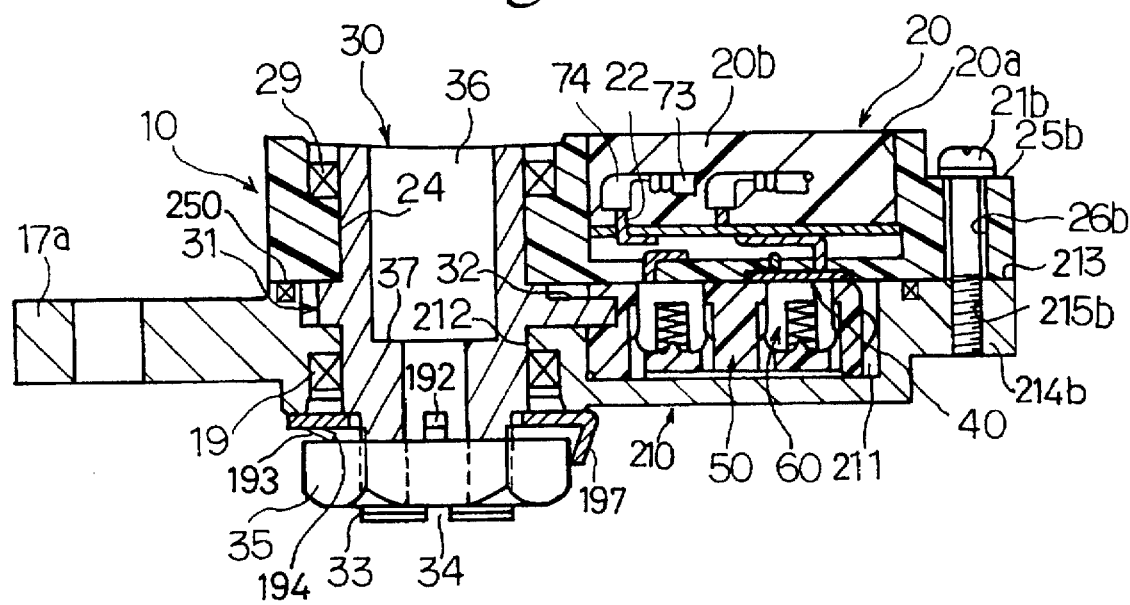
FIG. 17 is a view corresponding to FIG. 3 according to a second embodiment of the present invention.
Figure 18:
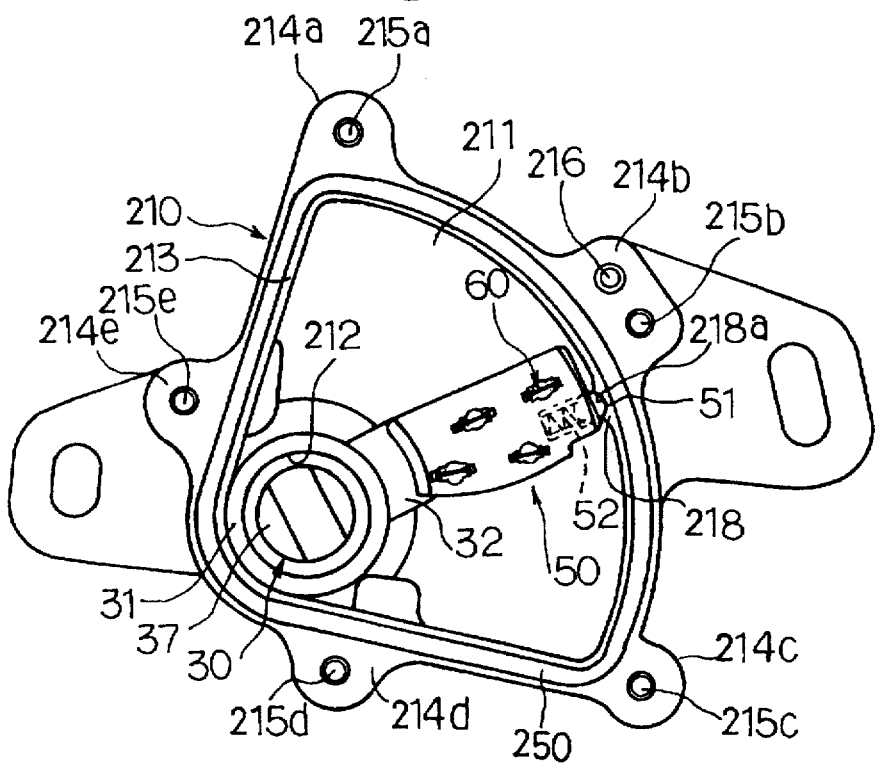
FIG. 18 is a view corresponding to FIG. 4 according to the second embodiment.

As apparent from FIGS. 17 and 18, a switch case 210 forms a recession 211 open on the front side and it is provided with a step portion 213 for supporting a stationary contact base 20. A portion corresponding to the outer peripheral wall 10b in the previous embodiment is omitted here.

A shaft hole 212 is formed at a pivot of the fan of the switch case 210. Mounting step portions 214a, 214b, 214c, 214d and 214e are projectingly formed outside the outer peripheral portion and tapped holes 215a, 215b, 215c, 215d and 215e are formed on each mounting step portion. Reference numeral 250 is a seal packing.

In order to assemble the switching device of the present embodiment, a side of a male screw portion 33 of a shaft holder 30 is first fitted into a shaft hole 212 of the switch case 210. A movable contact holder 50 integrally formed with the shaft holder 30 is then accommodated in a recession 211 and a click ball 51 engages an initial position groove 218a of a click guide 218.

Subsequently, a stationary contact base 20 is mounted on a step portion 213 of the switch case 210 while inserting the other side of the shaft holder 30 into a shaft hole 24. A positioning projection 126 is fitted in an elongated positioning slit 27 formed on a mounting boss 25b of the stationary contact base 20.

Even if there is no such a recession for fitting the stationary contact base 20 on the switch case, it is possible to remove play of the stationary contact base 20 in the circumferential direction by the provision of the elongated positioning slit 27 and the positioning projection 126. Accordingly, since the elongated positioning slit 27 is made long in the radial direction of the shaft hole 24, each of the mounting step portion 214a, 214b, 214c, 214d and 214e, and 25a, 25b, 25c, 25d, and 25e is overlapped each other while adjusting the position in the radial direction. Next, it is necessary to correspond the tapped holes 215a through 215e with the counterparts 26a through 26e. After this, the stationary contact base 20 and the switch case 210 are fastened by screws 21a through 21e.

With this structure described above, since the switch case is not required to have the outer peripheral wall, it is possible to make the switching device more compact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A switching device comprising:
   a substantially fan-shaped switch case having a switch case recession with one side of said recession having a substantially fan-shaped plane opened and a movable contact holder recession which is quite deeper than the switch case recession;
   a substantially fan-shaped stationary contact base having an outer periphery secured to an outer periphery of the switch case by a screw;
   a rotatably supported shaft member passing through a shaft hole provided at pivots of the fan-shaped switch case and the fan-shaped stationary contact base;
   an arm-like movable contact holder accommodated in the movable contact holder recession and having one end rotatably secured to the shaft member to move integrally therewith and having another end provided with a movable contact which slidably contacts a stationary contact mounted on one side of the stationary contact base;
   wherein a positioning projection is provided on either the outer periphery of the switch case or the outer periphery of the stationary contact base to project therefrom, while an elongated positioning slot is provided at a corresponding position of the outer periphery of the switch case or stationary contact base to engage with the positioning projection, and a longitudinal direction of the elongated positioning slot corresponds with a radial direction of the shaft hole.

2. The switching device according to claim 1, wherein the movable contact holder is provided at a tip end opposite to the shaft member with a click ball energized by a spring member toward a circular arc-shaped outer periphery of the switch case, wherein a click guide for engaging the click ball is provided at an inner wall of the circular arc-shaped outer periphery of the switch case.

3. The switching device according to claim 1, wherein a plurality of connecting projections are projectingly provided on a side of the stationary contact base for connection to the stationary contact, on an opposite side of which the movable contact is arranged to slidably contact, and terminals for a plurality of cords which are brought from the circular arc-shaped outer periphery of the stationary contact base are connected to the connecting projections, and positioning members are disposed between adjacent connecting projections to separate the cords individually.

4. The switching device according to claim 1, wherein the movable contact holder is provided with a step portion to serve as a movable contact mounting area which is formed in a lower position than the sliding contact portion between the movable contact holder and the stationary contact base, and the step portion is provided with a contact recession for mounting the movable contact, while a parting line produced around the contact recession when the movable contact holder is molded by a joint die of a first and second metal dies, is located within the movable contact mounting area.

5. The switching device according to claim 4, wherein the contact recession comprises a substantially cylindrical circular recession at a center, elongated groove-shaped recessions extending on two sides in a diametral direction from the circular recession, and enlarged escape portions formed on a connecting portion between the circular recession and the elongated groove-shaped recessions, and the parting line is located at the escape portions.

6. A switching device comprising:
   a substantially fan-shaped switch case having a movable contact holder recession in a substantially fan-shaped plane of said case;

a substantially fan-shaped stationary contact base having an outer periphery secured to an outer periphery of switch case by a screw;

a rotatably supported shaft member passing through a shaft hole provided at pivots of the fan-shaped switch case and the fan-shaped stationary contact base;

an arm-like movable contact holder accommodated in the movable contact holder recession and having one end rotatably secured to the shaft member to move integrally therewith and having another end provided with a movable contact which slidably contacts a stationary contact mounted on one side of the stationary contact base;

wherein a positioning projection is provided on either the outer periphery of the switch case or the outer periphery of the stationary contact base to project therefrom, while an elongated positioning slot is provided at a corresponding position of the outer periphery of either the switch case or contact base to engage with the positioning projection, and a longitudinal direction of the elongated positioning slot corresponds with a radial direction of the shaft hole.

7. The switching device according to claim 6, wherein the movable contact holder is provided at a tip end opposite to the shaft member with a click ball energized by a spring member toward a circular arc-shaped outer periphery of the switch case, wherein a click guide for engaging the click ball is provided at an inner wall of the circular arc-shaped outer periphery of the switch case.

8. The switching device according to claim 6, wherein a plurality of connecting projections are projectingly provided on a side of the stationary contact base for connection to the stationary contact, on an opposite side of which the movable contact is arranged to slidably contact, and terminals for a plurality of cords which are brought from the circular arc-shaped outer periphery of the stationary contact base are connected to the connecting projections, and positioning members are disposed between the adjacent connecting projections to separate cords individually.

9. The switching device according to claim 6, wherein the movable contact holder is provided with a step portion to serve as a movable contact mounting area which is formed in a lower position than a sliding contact portion between the movable contact holder and the stationary contact base, and the step portion is provided with a contact recession for mounting the movable contact, while a parting line produced around the contact recession when the movable contact holder is molded by a joint die of a first and second metal dies, is located within the movable contact mounting area.

10. The switching device according to claim 9, wherein the contact recession comprises a substantially cylindrical circular recession at a center, elongated groove-shaped recessions extending on two sides in a diametral direction from the circular recession, and enlarged escape portions formed on a connecting portion between the circular recession and the elongated groove-shaped recessions, and the parting line is located at the escape portions.

11. A switching device comprising:

a male screw portion with slits formed on a shaft member which is rotatably supported by a switch body, said shaft member having a step portion; and a taper nut fastened through a whirl-stop washer to the male screw portion to reduce a diameter of the male screw portion, thereby connecting the shaft member to a shift axis, wherein the whirl-stop washer is provided with a guide portion projecting from an inner peripheral edge toward a center for engagement with the slits of the male screw portion and with a spring portion formed by raising one end of the washer as a free end to face a different place from the guide portion, and the free end is located on an outer peripheral side rather than the inner peripheral edge of the whirl-stop washer, said taper nut and whirl-stop washer being secured to said step portion to form a clearance portion which permits free rotation of both said taper nut and whirl-stop washer relative to said switch body.

12. The switching device according to claim 11, wherein the free end of the spring portion projects to face a nut side.

13. The switching device according to claim 11, wherein the free end of the spring portion projects from the inner peripheral edge of the whirl-stop washer toward the center.

14. The switching device according to claim 11, wherein the free end of the spring portion projects from a plane portion of the whirl-stop washer to a circumferential direction.

15. The switching device according to claim 11, wherein the slits are formed at intervals of about 90° in a circumferential direction and the guide portions corresponding to the slits are also formed at intervals of about 90° in the circumferential direction, while the spring portions are provided at intervals of about 90° in the circumferential direction between guide portions.

16. A switching device comprising:

a switch case, a stationary contact base fitted in the switch case, a rotatably supported shaft member passing through a shaft hole formed in a corresponding place of the switch case and the stationary contact base and having a male screw portion with slits formed thereon and having a step portion, an oil seal interposed between the shaft hole and the shaft member, and a movable contact holder accommodated in a space between the stationary contact base and the switch case and having one end rotatably secured to the shaft member to move integrally therewith and having another end provided with a movable contact which is adapted to slidably contact a stationary contact provided on one side of the stationary contact base, wherein a taper nut is fastened through a whirl-stop washer to the male screw portion to reduce the diameter thereof, thereby connecting the shaft member to a shift axis;

wherein the whirl-stop washer is provided with a guide portion projecting from an inner peripheral edge toward a center for engagement with the slits of the male screw portion and with a spring portion formed by raising one end of the washer as a free end to face a different place from the guide portion, and the free end is located on an outer peripheral side rather than the inner peripheral edge of the whirl-stop washer, said taper nut and whirl-stop washer being secured to said step portion to form a clearance portion which permits free rotation of both said taper nut and whirl-stop washer relative to said switch case.

17. The switching device according to claim 16, wherein the free end of the spring portion projects to face a nut side.

18. The switching device according to claim 16, wherein the free end of the spring portion projects from the inner peripheral edge of the whirl-stop washer toward the center.

19. The switching device according to claim 16, wherein the free end of the spring portion projects from a plane portion of the whirl-stop washer to a circumferential direction.

20. The switching device according to claim 16, wherein the slits are formed at intervals of about 90° in a circumferential direction and the guide portions corresponding to the slits are also formed at intervals of about 90° in the circumferential direction, while the spring portions are provided at intervals of about 90° between the guide portions.

* * * * *